May 23, 1944.  R. E. STOETZL ET AL  2,349,386
HAY HANDLING APPARATUS
Filed Nov. 4, 1941  2 Sheets-Sheet 1
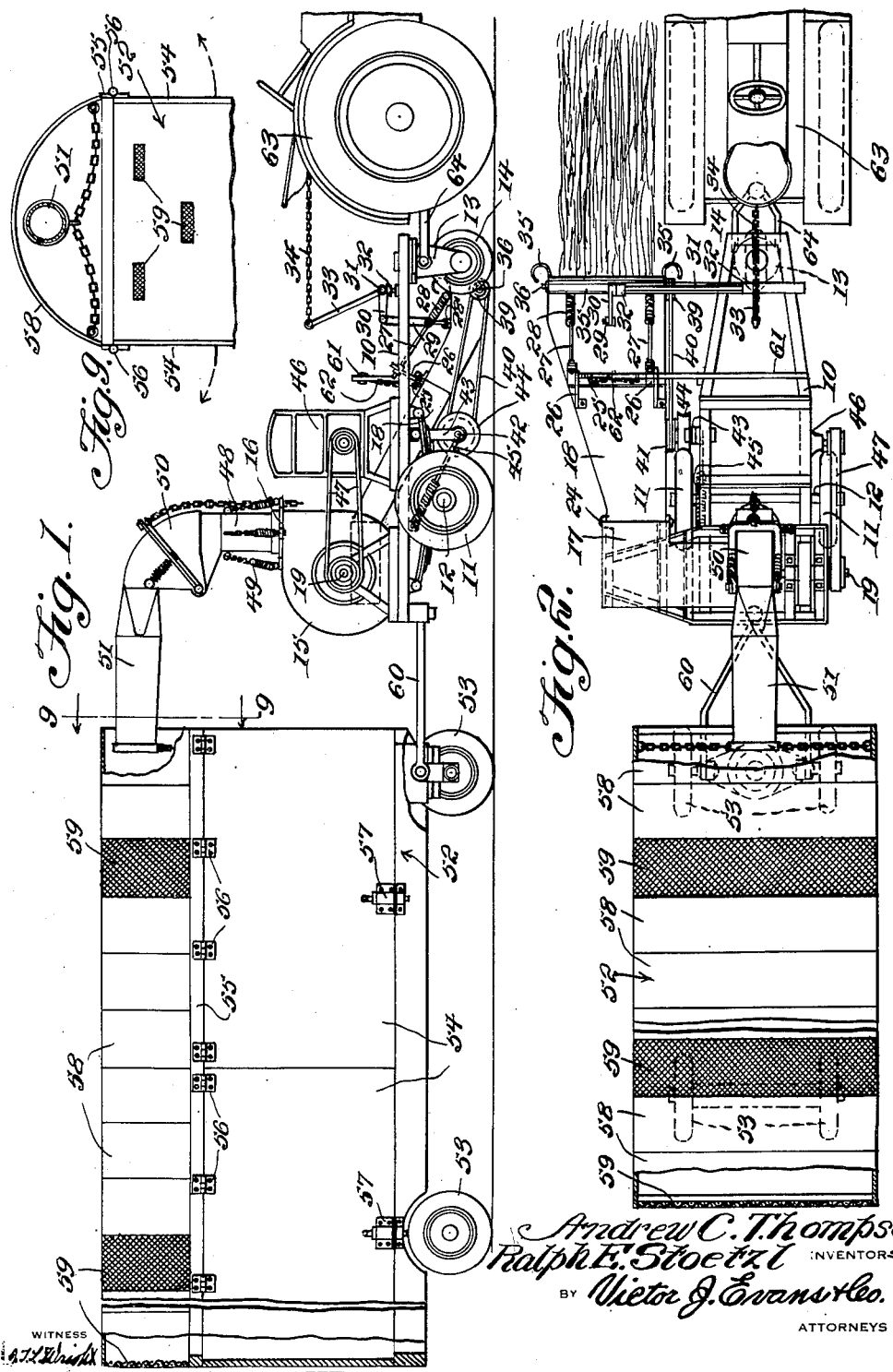

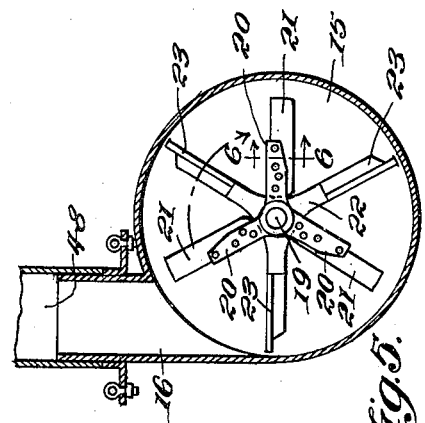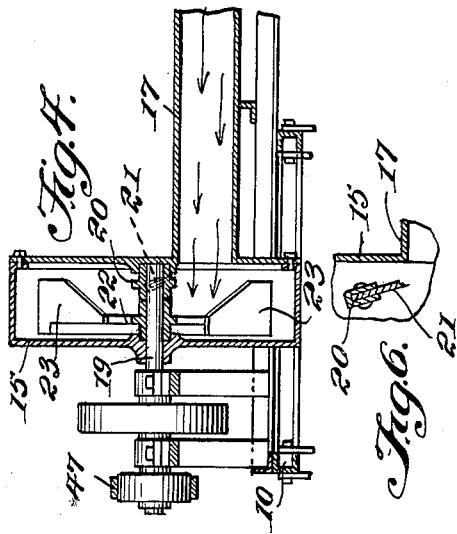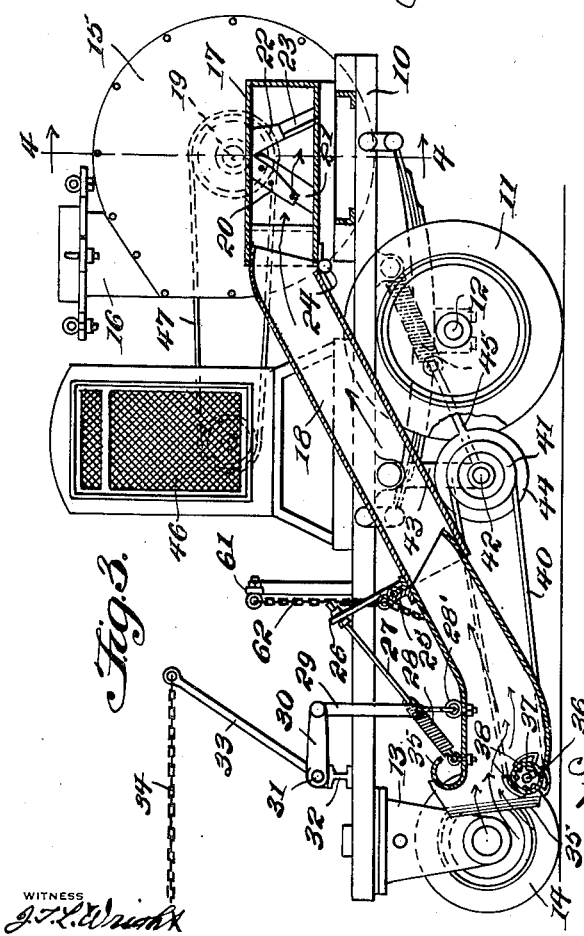

Patented May 23, 1944

2,349,386

UNITED STATES PATENT OFFICE 2,349,386

HAY HANDLING APPARATUS

Ralph E. Stoetzl and Andrew C. Thompson, Madera, Calif.

Application November 4, 1941, Serial No. 417,834

1 Claim. (Cl. 56—27)

The present invention relates to improvements in apparatus for handling hay and other materials.

An important object of the invention is to provide hay handling apparatus of generally improved design.

Another object of the invention is to provide apparatus for handling hay and the like and which is equipped with a self-feeding pickup.

A further object of the invention is to provide a hay handling apparatus which is reliable and efficient in operation.

Other objects and advantages of the invention will become apparent as the description progresses.

In the accompanying drawings forming a part of the specification and in which like numerals are employed to designate corresponding parts:

Figure 1 is a side elevational view of the assembled apparatus.

Figure 2 is a top plan view of the same.

Figure 3 is an enlarged side elevation of the loader unit partly in section.

Figure 4 is an axial view taken on line 4—4 of Figure 3.

Figure 5 is a transverse sectional view through the same.

Figure 6 is a detail section taken on line 6—6 of Figure 5.

Figure 7 is a front elevational view of the pickup roller showing an end portion in section.

Figure 8 is a transverse section taken on line 8—8 of Figure 7, and

Figure 9 is a fragmentary transverse section taken on line 9—9 of Figure 1.

Referring to the drawings, wherein is illustrated a preferred embodiment of the invention, 10 designates the frame of the loader unit having the rear portion supported on wheels 11 mounted on a transverse shaft 12. At the front reduced end of the frame 10 is provided a swivel bracket 13 on which is journalled a forward supporting wheel 14.

On the rearward section of the loader frame is fastened an approximately cylindrical blower casing 15 mounted transversely on the frame and having a tangential upwardly directed outlet 16. One end of the casing 15 is formed to provide a lateral extension 17 provided with a forwardly directed inlet port designed for connection with a feed conduit 18. Within the casing 15 is journalled a shaft 19 to which are secured a plurality of radial arms 20 of channel shape in cross section. To these arms are secured, by rivets or other suitable fastening elements, radial and inclined cutter blades 21. To a spider 22 fastened on the shaft 19 are connected relatively radially disposed fan blades 23 designed to create a draft discharging through the outlet 16.

The conduit 18 extends forwardly at one side of the loader frame and is shaped to provide an increased taper toward the forward open end which is normally designed to assume a position adjacent the ground. With this in mind, the rear end of the conduit is connected with the casing extension by a hinge connection 24 and is constructed to afford a forward section united with the major rear section by a hinge 25. To a pair of upwardly extending arms 26 are loosely connected a pair of rods 27 operatively associated with coiled springs 28 attached to the front end of the conduit. This forward portion of the feed conduit is also connected to a link 29 engaging an eye 28' and a crank 30 fastened to a transversely arranged shaft 31 journalled on bearing brackets 32. On the inner portion of the shaft 31 is secured an operating lever 33 formed at the upper extremity with an eye connected with an operating chain 34. This spring and crank mechanism is devised to yieldingly maintain the front of the conduit in proper position on the ground and also to enable selective elevation thereof when required.

As shown to advantage in Figures 2 and 3, the feed opening of the conduit 18 has the top and side edges bent in rolled form, as indicated at 35, for efficient feed operation. In the bottom of the feed inlet is journalled a transversely arranged rotary shaft 36 having fastened thereon between the sides of the conduit an enlarged cylindrical and hollow roller 37. At longitudinally spaced and staggered intervals on the roller 37 are mounted pickup fingers 38 in the form of wire or rod elements bent to provide segments terminating in radial pins removably engaging apertures in the roller and mounted eccentrically of the roller as illustrated at Figure 8. It will be noted that these fingers extend substantially along the circumference of the roller shell and operate to actuate the hay in the manner of an over-feed. On on exterior extension of the shaft 36 is secured a pulley 39 connected through the medium of a belt 40 with a drive pulley 41 fastened on the shaft 42 journalled on a hanger bracket 43 pivotally suspended from the frame 10. At one side of the pulley 41 a drive wheel 44 is secured on the shaft 42 and is yieldingly urged through a rod and spring connection 45 against one of the carrier wheels 11.

Although the blower may be driven from any preferred source of power I contemplate driving the same through the medium of a conventional drive motor 46 mounted on the intermediate portion of the loader frame and making connection with the blower wheel through an endless belt 47.

The hay or other material discharged from the blower is carried upward through a loader conduit 48 which makes flexible connection with the blower outlet 16 through a telescopic connection which allows angular as well as rotary movement of this conduit which is resiliently connected with the blower casing through the medium of a plurality of resilient tie elements 49. A segmental hood 50 is pivotally mounted on the upper end of the conduit 48 while its outlet connects with an extension conduit 51 normally disposed in approximately horizontal position to discharge the material into a carrier.

This carrier may advantageously comprise a vehicle having a box-shaped body 52 mounted on wheels 53 and constructed so that the sides are transversely divided to provide independently movable side sections 54. Each of these sections is suspended from an elevated frame bar 55 on hinges 56 while the bottom portion is releasably locked in vertical closed position by suitable latch means 57. This arrangement enables swinging the side sections outwardly at the bottom of the carrier to facilitate the discharge of material therefrom. On the top frame 56 of the carrier is fastened a superposed roof structure consisting mainly of imperforate sections 58 of approximately U-formation in cross section while having adjacent the front a perforated section 59 which may be formed of fine mesh wire. Similar perforated or open mesh sections are provided at the rear end portion of the top and at the rear end wall part thereof. These open mesh sections of the carrier top allow escape of air and dust and obviate objectionable back pressure.

The carrier is attached to the loader unit in trailer relation by the draft bar 60 designed to space these sections so that the conduit 51 projects suitably within the forward roof portion of the carrier vehicle.

An angle bar 61 fastened to the frame 10 and bent to form an elevated laterally projecting bracket is connected, through chains 62, with the conduit 18 to provide an additional support for the latter.

The joined loader and carrier sections of the apparatus may advantageously be drawn by a conventional tractor 63 connected to the loader by a draft bar 64 attached directly to the swivel front wheel mounting 13. When the assembly is employed for gathering hay from windrows the forwardly directed inlet of the pickup conduit may be constantly maintained in effective pickup relation with the ground regardless of irregularity so that the blower functions to draw the hay inward through the pickup and discharges the same through the loading conduit into the trailing carrier which may be conveniently emptied upon filling. The invention thus provides a highly efficient apparatus for handling, that is gathering and carrying, hay and like material.

It is to be understood that the form of our invention herewith shown and described is to be taken as a preferred example of the same and that various changes relative to the material, size, shape and arrangement of parts may be resorted to without departing from the spirit of the invention or the scope of the subjoined claim.

What is claimed is:

In a loading apparatus, a wheeled frame, a blower mounted on the rear of the frame, a rigid conduit supported on the frame having its main portion disposed at one side of the latter and extending in the direction of its travel, a transversely arranged extension connecting the rear end of the said conduit with the inlet of the blower, a pickup conduit section aligned with and hingedly connected to the forward open end of the main portion of the said rigid conduit, the said pickup section having an inlet opening at the front end thereof, a rotatably driven feed roller supported transversely at the bottom of the said inlet opening, a plurality of circumferentially disposed arcuate pickup elements mounted eccentrically about exterior segmental portions of the said roller, a pair of rigid arms extending upwardly from the forward end of the main portion of the rigid conduit, a forwardly extending rod flexibly connected with the upper end of each arm, and a tension spring providing connection between the front end of each rod and the forward end of the pickup conduit section for resiliently supporting the latter.

RALPH E. STOETZL.
ANDREW C. THOMPSON.